United States Patent
Kleiner et al.

(10) Patent No.: US 10,999,324 B2
(45) Date of Patent: May 4, 2021

(54) DIRECT-CONNECT WEB ENDPOINT

(71) Applicant: Forcepoint LLC, Austin, TX (US)

(72) Inventors: Roman Kleiner, San Diego, CA (US);
Yuen-Pin Yeap, Saratoga, CA (US);
Jason Wieland, Cardiff, CA (US)

(73) Assignee: Forcepoint, LLC, Austin, TX (US)

( * ) Notice: Subject to any disclaimer, the term of this patent is extended or adjusted under 35 U.S.C. 154(b) by 340 days.

(21) Appl. No.: 15/666,100

(22) Filed: Aug. 1, 2017

(65) Prior Publication Data
US 2019/0044914 A1    Feb. 7, 2019

(51) Int. Cl.
*H04L 29/06*      (2006.01)

(52) U.S. Cl.
CPC .......... *H04L 63/20* (2013.01); *H04L 63/0236* (2013.01); *H04L 63/0263* (2013.01); *H04L 63/10* (2013.01); *H04L 63/18* (2013.01)

(58) Field of Classification Search
CPC ....... H04L 63/20; H04L 63/10; H04L 63/105; H04L 63/107; H04L 63/108; H04L 63/18
See application file for complete search history.

(56) References Cited

U.S. PATENT DOCUMENTS

| | | | | |
|---|---|---|---|---|
| 8,863,297 B2* | 10/2014 | Sharma | ............... | H04L 63/0815 726/26 |
| 8,955,091 B2* | 2/2015 | Kailash | ............... | H04L 63/1425 726/11 |
| 9,081,940 B2* | 7/2015 | Trevor | .................... | G06F 21/10 |
| 10,147,065 B1 | 12/2018 | Yiftachel et al. | | |
| 10,496,815 B1 | 12/2019 | Steiman et al. | | |
| 2002/0104014 A1 | 8/2002 | Zobel et al. | | |
| 2002/0156601 A1 | 10/2002 | Tu et al. | | |
| 2003/0105801 A1 | 6/2003 | Tse et al. | | |
| 2008/0086759 A1 | 4/2008 | Colson | | |

(Continued)

OTHER PUBLICATIONS

Goebel et al., Comparing Ingress and Egress Detection to Secure Interdomain Routing: An Experimental Analysis, Dec. 2011, ACM, vol. 11, No. 2, Article 5, pp. 5:1-5:26.

(Continued)

*Primary Examiner* — Zachary A. Davis
(74) *Attorney, Agent, or Firm* — Terrile, Cannatti & Chambers; Stephen A. Terrile

(57) ABSTRACT

A method, system and computer-usable medium are disclosed for enforcing a security policy, comprising: determining when an endpoint device initiates a web transaction with a web server, the endpoint device initiating the web transaction with a web-enabled application; establishing a side channel to a security service when the endpoint device initiates the web transaction with the web-enabled application; performing a categorization and policy enforcement operation via the security service in parallel with initiating the web transaction, the categorization and policy enforcement operation determining a security policy result regarding the web transaction; withholding content resulting from performance of the web transaction until the security policy result is provided by the security service, the content being withheld at the endpoint device; and, releasing the content resulting from the web transaction to the web-enabled application of the endpoint device upon receipt of an affirmative policy result from the security service.

20 Claims, 10 Drawing Sheets

(56) References Cited

U.S. PATENT DOCUMENTS

| | | |
|---|---|---|
| 2008/0288330 A1 | 11/2008 | Hildebrand et al. |
| 2009/0177985 A1 | 7/2009 | Mueller et al. |
| 2009/0199264 A1 | 8/2009 | Lang |
| 2010/0064341 A1 | 3/2010 | Aldera |
| 2010/0169474 A1 | 7/2010 | Beckett, III et al. |
| 2010/0212010 A1* | 8/2010 | Stringer .................. G06F 21/52 726/22 |
| 2011/0225650 A1 | 9/2011 | Margolies et al. |
| 2011/0307957 A1 | 12/2011 | Barcelo et al. |
| 2013/0246605 A1 | 9/2013 | Mahadik et al. |
| 2014/0007132 A1 | 1/2014 | Gaxiola et al. |
| 2015/0074750 A1 | 3/2015 | Pearcy et al. |
| 2015/0229624 A1 | 8/2015 | Grigg et al. |
| 2015/0339477 A1 | 11/2015 | Abrams et al. |
| 2016/0004862 A1 | 1/2016 | Almehmadi et al. |
| 2016/0180078 A1 | 6/2016 | Chhabra et al. |
| 2016/0205106 A1 | 7/2016 | Yacoub et al. |
| 2016/0226911 A1 | 8/2016 | Boss et al. |
| 2016/0232352 A1 | 8/2016 | Chen et al. |
| 2016/0232353 A1 | 8/2016 | Gupta et al. |
| 2016/0248797 A1 | 8/2016 | Yampolskiy et al. |
| 2016/0321352 A1 | 11/2016 | Patel et al. |
| 2016/0328562 A1 | 11/2016 | Saxena et al. |
| 2016/0357778 A1 | 12/2016 | MacKenzie et al. |
| 2017/0070506 A1* | 3/2017 | Reddy .................. H04L 63/10 |
| 2017/0230417 A1 | 8/2017 | Amar et al. |
| 2017/0286671 A1 | 10/2017 | Chari et al. |
| 2018/0004948 A1 | 1/2018 | Martin et al. |
| 2018/0027006 A1 | 1/2018 | Zimmermann et al. |
| 2018/0084012 A1 | 3/2018 | Joseph et al. |
| 2018/0124091 A1 | 5/2018 | Sweeney et al. |
| 2018/0218157 A1 | 8/2018 | Price et al. |
| 2018/0302266 A1 | 10/2018 | Makovsky et al. |
| 2018/0307833 A1 | 10/2018 | Noeth et al. |
| 2018/0309795 A1* | 10/2018 | Ithal .................. H04L 63/0227 |
| 2018/0316684 A1* | 11/2018 | Desai .................. H04L 63/101 |
| 2018/0337971 A1 | 11/2018 | Aleksandrov |
| 2018/0341758 A1 | 11/2018 | Park et al. |
| 2019/0066670 A1 | 2/2019 | White et al. |
| 2019/0205533 A1 | 7/2019 | Diehl et al. |
| 2019/0318128 A1 | 10/2019 | Ackerman et al. |

OTHER PUBLICATIONS

Papagiannapoulou et al., Concept-Based Image Clustering and Summarization of Event-Related Image Collections, Nov. 7, 2014, ACM, pp. 23-28.

Pramit Choudhary, Introduction to Anomaly Detection, Oracle Data Science, Feb. 15, 2017 https://blogs.oracle.com/datascience/introduction-to-anomaly-detection.

Anomaly, Detecting Anomalies with Moving Median Decomposition, Jan. 12, 2016 https://anomaly.io/anomaly-detection-moving-median-decomposition/.

NRCS, U.S. Department of Agriculture, Natural Resources Conservation Service, Media vs. Average to Describe Normal, downloaded Jul. 8, 2020, https://www.wcc.nrcs.usda.gov/normals/median_average.htm.

The Mitre Corporation, Mitre ATT&CK, Enterprise Matrix screenshot, Jul. 2, 2020, https://attack.mitre.org/matrices/enterprise/.

Du et al., Defense Deployment with Network Egress and Ingress Filtering, 2010, IEEE, pp. 1-6.

Manusankar et al., Intrusion Detection System with Packet Filtering for IP Spoofing, Dec. 29, 2010, IEEE pp. 563-567.

* cited by examiner

DIRECT-CONNECT WEB ENDPOINT

BACKGROUND OF THE INVENTION

Field of the Invention

The present invention relates in general to the field of computers and similar technologies, and in particular to software utilized in this field. Still more particularly, it relates to enforcing a security policy when an endpoint device is communicating with a target server without accessing an intermediate proxy server.

Description of the Related Art

Users interact with Internet-based content of all kinds on a daily basis. Each of these interactions poses some degree of security risk. As an example, a user's device may inadvertently become infected by malware embedded in seemingly innocent content provided by what appears to be a legitimate source. A common approach to addressing this issue is the use of a proxy server, which acts as an intermediary for requests from endpoint devices seeking content from other servers. One known advantage to such an approach is the proxy server can maintain a list of suspicious sites or servers, which can in turn be used to block the user's device from connecting to particular servers. By doing so, the proxy server can prevent potentially malicious content being returned to the user's device.

SUMMARY OF THE INVENTION

A method, system and computer-usable medium are disclosed for enforcing a security policy, comprising: determining when an endpoint device initiates a web transaction with a web server, the endpoint device initiating the web transaction with a web-enabled application; establishing a side channel to a security service when the endpoint device initiates the web transaction with the web-enabled application; performing a categorization and policy enforcement operation via the security service in parallel with initiating the web transaction, the categorization and policy enforcement operation determining a security policy result regarding the web transaction; withholding content resulting from performance of the web transaction the endpoint device until the security policy result is provided by the security service, the content being withheld at the endpoint device; and, releasing the content resulting from the web transaction to the web-enabled application of the endpoint device upon receipt of an affirmative policy result from the security service.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
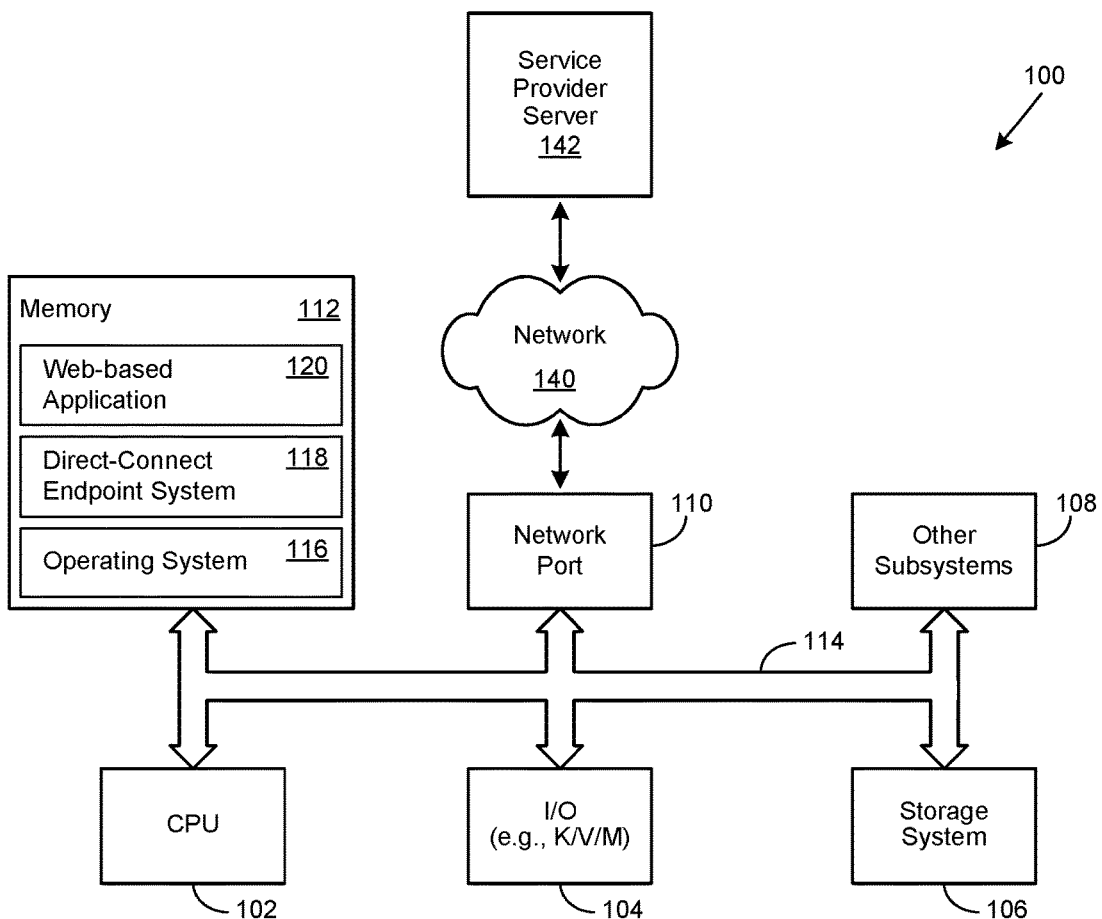
FIG. 1 depicts an exemplary client computer in which the present invention may be implemented.

Certain aspects of the present disclosure include an appreciation that a proxy server, whether implemented as a specialized information handling system or as a software application, acts as an intermediary for requests from client devices seeking resources from other servers. In general, a client device first establishes communication with a proxy server. Once the communication is established, the user may request a particular service, such as a file, connection, web page, or other resource available from a different server. In turn, the proxy server evaluates the request to determine whether it can simplify, manage or constrain its complexity. Once such evaluation is completed, the proxy server forwards the request to a target server.

Certain aspects of the present disclosure include an appreciation that one reason for the development of proxy servers was to add structure and encapsulation to distributed systems. Today, many proxy servers are configured as web proxies, which facilitate access to web-enabled content by providing anonymity, bypassing IP address blocking, or a combination of the two. Proxy servers can also be used to censor undesirable content through the implementation of a particular type of proxy, commonly referred to as a content filter. Other approaches to such censorship involve the use of a cache-extension protocol such as Internet Content Adaption Protocol (ICAP), which allows plug-in extensions to an open caching architecture.

Certain aspects of the present disclosure include an appreciation that various proxy servers, such as a content filtering proxy, often support user authentication to control web access. Certain aspects of the disclosure include an appreciation that a target server typically sees the egress Internet Protocol (IP) address of the user's browser traffic. Accordingly, the target server can provide content that is localized for the user's location. However, it will likewise be appreciated that the use of a proxy server generally results in a target server seeing the IP address of the proxy server, not the user's browser. As a result, content provided by the target server may be incorrectly localized for the user, as it will likely be localized for the location of the proxy server, which may be in a different location.

Certain aspects of the present disclosure include an appreciation that third party security systems may compromise content localization, irrespective of the geographic location of the user. As an example, a mobile user may temporarily connect to a customer's network, which is secured by a third party security system. As a result, content provided by a target server may be localized for the location of the third party security system, rather than the actual location of the user. Certain aspects of the present disclosure include an appreciation that certain geographical firewalls may block proxied web traffic. As an example, certain nations implement firewalls that block proxied web traffic, in general, or to certain web sites or Uniform Resource Locators (URLs). As another example, proxied web traffic may be geofenced by implementing a firewall that blocks such traffic to addresses outside a particular geographical area.

Certain aspects of the present disclosure include an appreciation that various proxy approaches rely on the use of a proxy auto-config (PAC) file to redirect web traffic associated with a user's browser to a proxy server for analysis. It will likewise be appreciated that the usefulness of such PAC files to redirect web traffic to proxy servers relies on predictable browser behavior to enforce their use. However, such behavior can vary from browser to browser, and version to version, where the resulting effect may range from possible connection delays to completely lost connections.

Certain aspects of the present disclosure include an appreciation that not all websites work well with a proxy server, either in general, or with certain proxy server implementations. Accordingly, a user may be blocked from accessing such sites, even though they pose no known security threat. Certain aspects of the present disclosure include an appreciation that not all web applications work well with proxy servers, either in general, or with certain implementations. Accordingly, a user may experience difficulty when using such applications in combination with a proxy server, even though the application may otherwise work effectively and as intended.

Certain aspects of the present disclosure include an appreciation that while various web gateway approaches may provide web traffic proxying via data centers or points-of-presence (PoP), such approaches generally fail to address certain issues associated with proxy servers, as described in greater detail herein. Certain aspects of the present disclosure include an appreciation that various web gateway approaches may provide traffic tunneling via Internet Protocol Security (IPSec), policy-based routing (PBR), or generic routing encapsulation (GRE) to data centers or PoPs. However, such approaches generally fail to address certain issues associated with proxy servers, as described in greater detail herein. Furthermore, they typically do not support use cases involving roaming users. Certain aspects of the present disclosure include an appreciation that various web gateway approaches may provide an on-premises lightweight appliance that provides local filtering capabilities while being managed from the cloud. While such approaches may address certain issues associated with proxy servers, as described in greater detail herein, they not only require the deployment and maintenance of such appliances, they also generally fail to support roaming users.

A method, system and computer-usable medium are disclosed for enforcing a security policy when an endpoint device is directly communicating with a target server without accessing an intermediate proxy server. As used herein, such direct communication between an endpoint device and a target server without accessing an intermediate proxy server may be variously referred to as "directly-connected," a "direct-connection," or a "direct-connect" communication between the endpoint device and the target server. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more storage systems, one or more network ports for communicating externally, as well as various input and output (I/O) devices, such as a keyboard, a mouse, and a graphics display.

FIG. 1 is a generalized illustration of an information handling system 100 that can be used to implement the system and method of the present invention. The information handling system 100 includes: a processor (e.g., central processor unit or "CPU") 102; input/output (I/O) devices 104, such as a display, a keyboard, a mouse, and associated controllers; a storage system 106; and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a direct-connect endpoint system 118 and a web-enabled application 120. In certain embodiments, the information handling system 100 is able to download the direct-connect endpoint system 118 from the service provider server 142. In another embodiment, the direct-connect endpoint system 118 is provided as a service from the service provider server 142.

In various embodiments, the direct-connect endpoint system 118 performs a security policy enforcement operation. In certain embodiments, the security policy enforcement operation improves processor efficiency, and thus the efficiency of the information handling system 100, by enforcement of the security policy. As will be appreciated, once the information handling system 100 is configured to perform the security policy enforcement operation, the information handling system 100 becomes a specialized computing device specifically configured to perform the security policy enforcement operation and is no longer a general purpose computing device. Moreover, the implementation of the direct-connect endpoint system 118 on the information handling system 100 improves the functionality of the information handling system 100 and provides a useful and concrete result of security policy enforcement.

Figure 2:
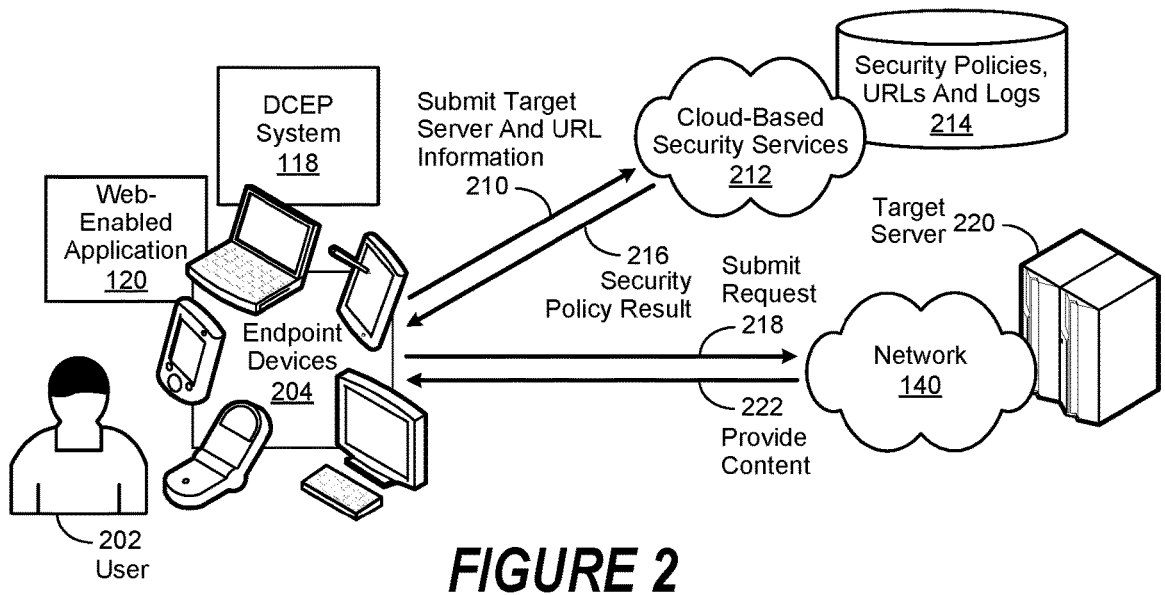
FIG. 2 is a simplified block diagram of a direct-connect endpoint (DCEP) system implemented to perform endpoint security policy enforcement operations.

FIG. 2 is a simplified block diagram of a direct-connect endpoint (DCEP) system implemented in accordance with an embodiment of the invention to perform endpoint security policy enforcement operations. In various embodiments, a DCEP system 118 is implemented to interact with a web-enabled application 120 to extend enforcement of web policy and security controls to roaming users and remote offices that may not have access to a network secured by a proxy server. As used herein, a web-enabled application 120 broadly refers to a software application which includes an ability to communicate with a web server over a network 140. In certain embodiments, the web-enabled application 120 is implemented to use Hypertext Transfer Protocol (HTTP) to communicate information over a network 140. In certain embodiments, the web-enabled application 120 is implemented on an endpoint device 204.

In certain embodiments, the web-enabled application 120 may be implemented to use Secure HTTP (HTTPS) to communicate information over the network 140. In certain embodiments, the web-enabled application 120 may be implemented as a web browser, familiar to skilled practitioners of the art. In certain embodiments, the web-enabled application may be implemented as a mobile device application, likewise familiar to those of skill in the art. In certain embodiments, implementation of the DCEP 118 system allows geo-localized content to be delivered to the web-enabled application 120 according to the geographical location of an endpoint device 204.

As used herein, an endpoint device 204 refers to an information processing system, such as a personal computer, a laptop computer, a tablet computer, a personal digital assistant (PDA), a smart phone, a mobile telephone, a digital camera, a video camera, or other device capable of storing, processing and communicating data. In various embodiments, the communication of the data may take place in real-time or near-real-time. In certain embodiments, the communication of the information may take place asynchronously. For example, an email message may be stored on an endpoint device 204 when it is offline. In this example, the information may be communicated to its intended recipient once the endpoint device 204 gains access to a network 140.

In certain embodiments, implementation of the DCEP 118 system allows web policy and security controls to be enforced in network 140 environments that are unmanaged, use tunneling protocol (TP) to support a virtual private network (VPN), are complex, or some combination thereof. In certain embodiments, implementation of the DCEP 118 system allows web policy and security controls to be enforced in network 140 environments that use geographic firewalls. In certain embodiments, implementation of the DCEP 118 system allows web policy and security controls to be enforced in network 140 environments that experience changing network conditions. In certain embodiments, implementation of the DCEP 118 system allows web policy and security controls to be enforced in situations where a particular web site or web-enabled application 120 does not work well with proxy servers. In certain embodiments, implementation of the DCEP 118 system provides improved performance in the enforcement of web policy and security controls in various network 140 environments.

Referring now to FIG. 2, an endpoint device 204 establishes a direct-connection to the target server 220 without accessing an intermediate proxy server. Once the direct-connection is established, the endpoint device 204 submits a request 218, such as a request for content, via a network 140, to the target server 220. In response, the target server 220 provides the requested content 222 to the endpoint device 204, where it is intercepted by the DCEP 118 system.

In certain embodiments, information associated with the intercepted content 222, such as the Internet Protocol (IP) address of the target server 220, Uniform Resource Locator (URL) information associated with the provided content 222, or a combination thereof, is submitted 210 to cloud-based security services 212. In response, the cloud-based security services 212 process the submitted information with various information stored in a repository of security policies, URLs and additional configuration information 214 to determine an applicable security policy result 216. In certain embodiments, the security policy result 216 may be a security policy decision. In certain embodiments, the security policy result 216 may be a security policy action. In certain embodiments, the security policy action may be performed by the DCEP 118 system.

The resulting security policy action 216 is then provided back to the DCEP 118 system, where it is then enforced to determine whether to allow the content 222 to be provided to the user 202. In certain embodiments, the security policy result 216 is retained by the DCEP 118 system for future use. As an example, the user 202 may subsequently attempt to access the same target server 220 or URL associated with the originally-provided content. In this example, the DCEP 118 system would use the stored security policy result 216 to determine whether to provide the content 222 to the user 202 rather than submit 210 information associated with the intercepted content 222 to the cloud-based security services 212.

In certain embodiments, the submission 210 of the target server and URL information, and the resulting provision of an associated security policy result 216 is broadly referred to as a side channel look-up. In certain embodiments, the submission 210 of target server 220 and URL information and security policy enforcement is performed in parallel with the submission 218 of a request for content to improve performance and provide a faster web-enabled application 120 experience to the user 202. In various embodiments, the configuration and operation of the DCEP 118 system are implemented to be agnostic to a particular network 140, endpoint device 204, web-enabled application 120, third party security device, or any combination thereof.

From the foregoing, it will be appreciated that a target server 220 would see a proxy server's IP address in typical proxy server implementations. In contrast, the target server 220 sees the endpoint device's 204 public IP address. In various embodiments, the endpoint device's 204 public IP address may be used to provide geographic locality information, such as a physical address, to the target server 220, which in turn allows the provision of location-based content.

Certain aspects of the present disclosure include an appreciation that current endpoint device 204 security approaches typically involve proxy enforcement and user authentication with the goal of providing seamless security and productivity controls for a user 202. However, such approaches typically fail to address bypassing third party filtering and access point implementations, which may hijack proxied traffic via OSI layers L4-L7 interception. Furthermore, such approaches typically do not enforce security policies at the endpoint device 204.

In various embodiments, the DCEP 118 system is implemented to enforce certain security policies without the use of an intermediary proxy server. In certain embodiments, the DCEP 118 system may be further implemented to analyze direct-connect web traffic between an endpoint device 204 and a target server, including URL information and content alike, to derive associated categories and file types. In certain embodiments, the DCEP 118 system may be further implemented to enforce a security policy within the user interface (UI) of the endpoint device 204, display a "blocked content" message as necessary, report locally-filtered transactions to the cloud-based security services 212, or a combination thereof.

Figure 3:
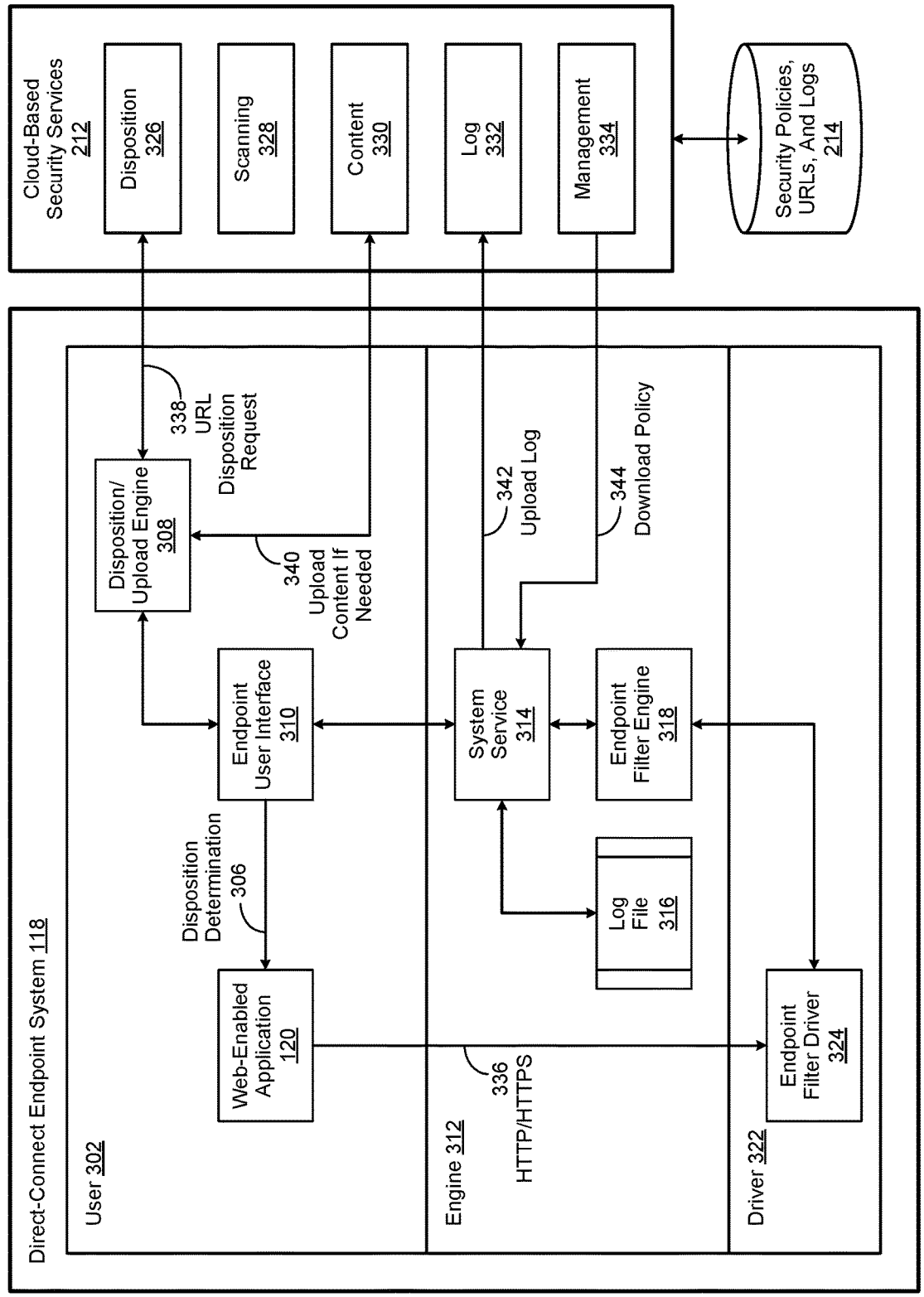
FIG. 3 is a simplified block diagram of a DCEP system.

FIG. 3 is a simplified block diagram of a direct-connect endpoint (DCEP) system implemented in accordance with an embodiment of the invention. In this embodiment, a DCEP 118 system is implemented to work in combination with cloud-based security services 212 to enforce a security policy without accessing an intermediate proxy server. As shown in FIG. 3, the DCEP 118 system includes a user 302 component, an engine 312 component, and a driver 322 component. Likewise, the user 302 component includes a web-enabled application 120, a disposition/upload 308 engine, and an endpoint user interface (UI) 310 module. The engine 312 component likewise includes a system service 314 module, an endpoint filter 318 engine, and a log file 316, while the driver 322 component includes an endpoint filter driver 324 module.

As likewise shown in FIG. 3, the cloud-based security services 212 includes a disposition 326 service, a scanning 328 service, a content 330 service, a log 332 service, and a management 334 service. In certain embodiments, the cloud-based security services 212 are implemented to retrieve and store certain information in a repository 214 of security policies, Uniform Resource Locators (URLs), and log data.

In various embodiments, the endpoint UI 310 module may be implemented to provide a visual presentation to the user of an endpoint device. As an example, it may be implemented to show an operating mode the DCEP 118 system, or the endpoint device itself, is currently in. In certain embodiments, the endpoint UI 310 module may be implemented to allow a user to enable or disable the DCEP 118 system.

In certain embodiments, the endpoint UI 310 module may be implemented to provide a disposition determination 306, described in greater detail herein, to the web-enabled application 120. As an example, the disposition determination 306 may include a blocked content message. In this example, the web-enabled application 120 may be implemented to display the blocked content message to a user within a UI window. In certain embodiments, the endpoint UI 310 module may be implemented to receive such a disposition determination 306 from the disposition/upload 308 engine.

In certain embodiments, the disposition/upload 308 engine may be implemented to submit URL disposition requests 338 associated with a target server or a URL to the cloud-based security services 212 for disposition determination. As used herein, a disposition broadly refers to an action to be performed in association with a particular web transaction. As likewise used herein, a web transaction broadly refers to a sequence of URLs that are combined to perform an individual, complete process. In various embodiments, the web transaction is the combination of a submitted request and a corresponding response. As an example, the web transaction may include a user of an endpoint device submitting a request for certain content from a target server, and in response, the target server providing the requested content to the user's endpoint device.

In certain embodiments, a URL disposition request 338 may include URL information associated with certain content provided by a particular target server. In certain embodiments, a URL disposition request 338 may include file header information associated with various files contained in certain content provided by a particular target server. In certain embodiments, a URL disposition request 338 may include a combination of URL information and header information associated with various files contained in certain content provided by a particular target server. In certain embodiments, the header information may include web protocol header information.

In certain embodiments, the disposition/upload 308 engine may be implemented to submit URL disposition requests 338 associated with a particular target server, or certain content it may provide, to the disposition service 326 in the cloud-based security services 212 for disposition determination. In certain embodiments, the disposition service 326 may be implemented to perform certain disposition determination operations described in greater detail herein. In certain embodiments, the disposition/upload 308 engine may be implemented to block, allow, or scan a user's request based upon the resulting disposition determination of a particular URL disposition request 338 associated with a particular target server.

In various embodiments, the disposition/upload engine 308 may be implemented to download certain content from a target server to the endpoint device. The disposition/upload 308 engine then uploads 340 the content to the cloud-based security services 212 for examination. In certain embodiments, the disposition/upload 308 engine uploads 340 the content to the content service 330 in the cloud-based security services 212 for examination. In certain embodiments, the disposition/upload 308 engine automatically uploads the content to the cloud-based security services 212 for examination upon its receipt from the target server. In certain embodiments, the disposition/upload 308 engine 308 uploads the content to the cloud-based security services 212 for examination in response to a request from the cloud-based security services 212.

In certain embodiments, the system service 314 module may be implemented to log DCEP 118 system events. In certain embodiments, the system service 314 module may log DECP 118 system events to a log file 316. In certain embodiments, the system service 314 module may be implemented to upload 342 DECP 118 system events to the log 332 service implemented in the cloud-based security services 212. In certain embodiments, the system service 314 module provides a command line interface to a user of the DECP 118 system. In certain embodiments, the system service 314 module may be implemented to log various debugging operations and their result. In certain embodiments, the system service 314 module may be implemented to download 344 security policy configuration information from the management 334 service implemented in the cloud-based security services 212. In certain embodiments, the system service 314 module may be implemented to receive disposition determination events from the endpoint UI 310 module.

In various embodiments, the filter engine 318 module may be implemented to apply a filter according to a management channel configuration familiar to skilled practitioners of the art. In certain embodiments, the management channel configuration is provided to the endpoint filter driver 324 module for application. In certain embodiments, the application of a management channel configuration is provided as a log event to the system service 314 module for logging.

In various embodiments, the endpoint filter driver 324 module is implemented to intercept Telecommunications Protocol (TCP) requests from the web-enabled application 120 and determine if such requests are Hypertext Transfer Protocol (HTTP) or Secure HTTP (HTTPS) 336 requests. In certain embodiments, the filter driver 324 module is implemented to apply a filter prior to determining the disposition of a URL request 338. As an example, a filter may be applied to ignore certain requests from a particular process. In certain embodiments, the filter is provided by the endpoint filter engine 318 module.

In various embodiments, the DCEP 118 system may be configured to enforce certain security policies associated with a particular endpoint device, a particular user, or a combination thereof. In certain embodiments, the DCEP 118 system may be configured to query the cloud-based security services 212 for a disposition determination related to enforcement of such security policies. In certain embodiments, the DCEP 118 system may be configured to enforce such security policies locally, as described in greater detail herein. In certain embodiments, the DCEP 118 system may be configured to use the cloud-based security services 212, as described in greater detail herein, to enforce such security policies. In certain embodiments, the DCEP 118 system may be configured to use a combination of local enforcement and the cloud-based security services 212, as described in greater detail herein, to enforce such security policies.

In certain embodiments, the DCEP 118 system may be configured to simply block or allow the provision of content received from a target server according to a disposition determination provided by the disposition service 326. In certain embodiments, the DCEP 118 system may be configured to conditionally block or allow the provision of content received from a target server according to a disposition determination provided by the disposition service 326. In certain embodiments, the DCEP 118 system may be configured to limit the provision of certain content received from a target server according to a disposition determination provided by the disposition service 326.

In certain embodiments, an HTTP 336 request may result in a URL disposition request 338 being submitted to the disposition 326 service. In certain embodiments, an HTTPS 336 request may result in a URL disposition request 338 being submitted to the disposition 326 service. In certain embodiments, an HTTPS 336 URL disposition request 338 may result in a "bypass" disposition determination being returned by the disposition 326 service. In certain embodiments, the return of such a bypass disposition determination may result in no further security policy operations being performed in relation to the HTTPS 336 URL disposition request 338.

In various embodiments, the disposition 326 service may be implemented to parse "downstream" headers upon receipt of a URL disposition request 338 to determine associated service, account and user details. In certain embodiments, the disposition 326 service may be implemented to first parse and decode a URL disposition request 338. Once the URL disposition request 338 is parsed and decoded, the repository 214 of security policies, URLs and logs is accessed to determine if an applicable security policy exists. If so, it is retrieved, along with any associated data. The parsed and decoded URL disposition request 338, along with the retrieved security policy and associated data, is then processed by the disposition 326 service to generate a disposition determination.

In certain embodiments, the resulting disposition determination is provided by the disposition 326 service to the disposition/upload 308 engine of the DCEP 118 system. In certain embodiments, the disposition 326 service may return a notification page, such as a page containing a "blocked content" message, to the disposition/upload 308 engine of the DCEP 118 system. In certain embodiments, the resulting disposition determination is provided by the disposition 326 service to the log 332 service, which then performs a logging operation to store the disposition determination in the repository 214 of security policies, URLs and logs.

In various embodiments, the management 334 service may be configured to provide certain configuration parameters and other settings to the DCEP 118 system. In certain embodiments, these configuration parameters and other settings may be used to affect the operation of the DCEP 118 system when it is enforcing a particular security policy. In certain embodiments, the management 334 service processes a security policy associated with a URL disposition request 338 to generate an object familiar to skilled practitioners of the art. In certain embodiments, the object is generated as a Javascript® Object Notation (JSON) object.

In certain embodiments, the resulting object is processed to generate a hash value. In certain embodiments, the resulting object is processed to generate a Message Digest 5 (MD5) checksum value. In certain embodiments, the resulting MD5 checksum value is used as a tag value. In certain embodiments, the tag value is used to provide content versioning information. In various embodiments, a cache of such objects, identified by their corresponding hash values, is stored in the repository 214 of security policies, URLs and logs. In certain embodiments, the cache is associated with a single instantiation of cloud-based security services 212. In certain embodiments, the cache is associated with two or more instantiations of cloud-based security services 212.

In certain embodiments, the scanning 328 service may be implemented to scan certain content provided by a target server to determine whether it is suitable for provision to a particular endpoint device, a particular user, or some combination thereof. As an example, the scanning 328 service may scan the content and determine it may contain malware. As another example, the scanning 328 service may scan the content and determine it may contain objectionable, inappropriate or confidential subject matter. As yet another example, the scanning 328 service may scan the content and determine that it may contain subject matter that is not intended for use by a particular endpoint device, a particular user, or some combination thereof.

In certain embodiments, the DCEP 118 system may be configured to process content received from a target server to generate a corresponding hash value, such as an MD5 checksum value. In certain embodiments, the DCEP 118 system may be configured to provide the resulting hash value as part of a URL disposition request 338 to the disposition 326 service. In certain embodiments, the disposition 326 service may be configured to access the repository 214 of security policies, URLs and logs to see whether a matching hash value exists. If so, the disposition service 326 may be configured to return a previously-determined disposition to the DCEP 118 system. If not, the disposition 326 service may be configured to request the content be uploaded 340 to the content 330 service.

Once uploaded, the disposition 326 service may be configured to provide the uploaded 340 content to the scanning 328 service to perform content scanning operations familiar to those of skill in the art. The disposition 326 service then processes the results of the scanning operations to generate a disposition determination, which is in turn provided to the DCEP 118 system. In certain embodiments, the disposition service may be configured to process the uploaded 340 content to generate a corresponding hash value, which is in turn associated with the URL corresponding to the uploaded 340 content. In certain embodiments, the resulting hash value and its associated URL are stored in the repository 214 of security policies, URLs and logs for use in future disposition operations performed by the disposition 326 service.

Figure 4:
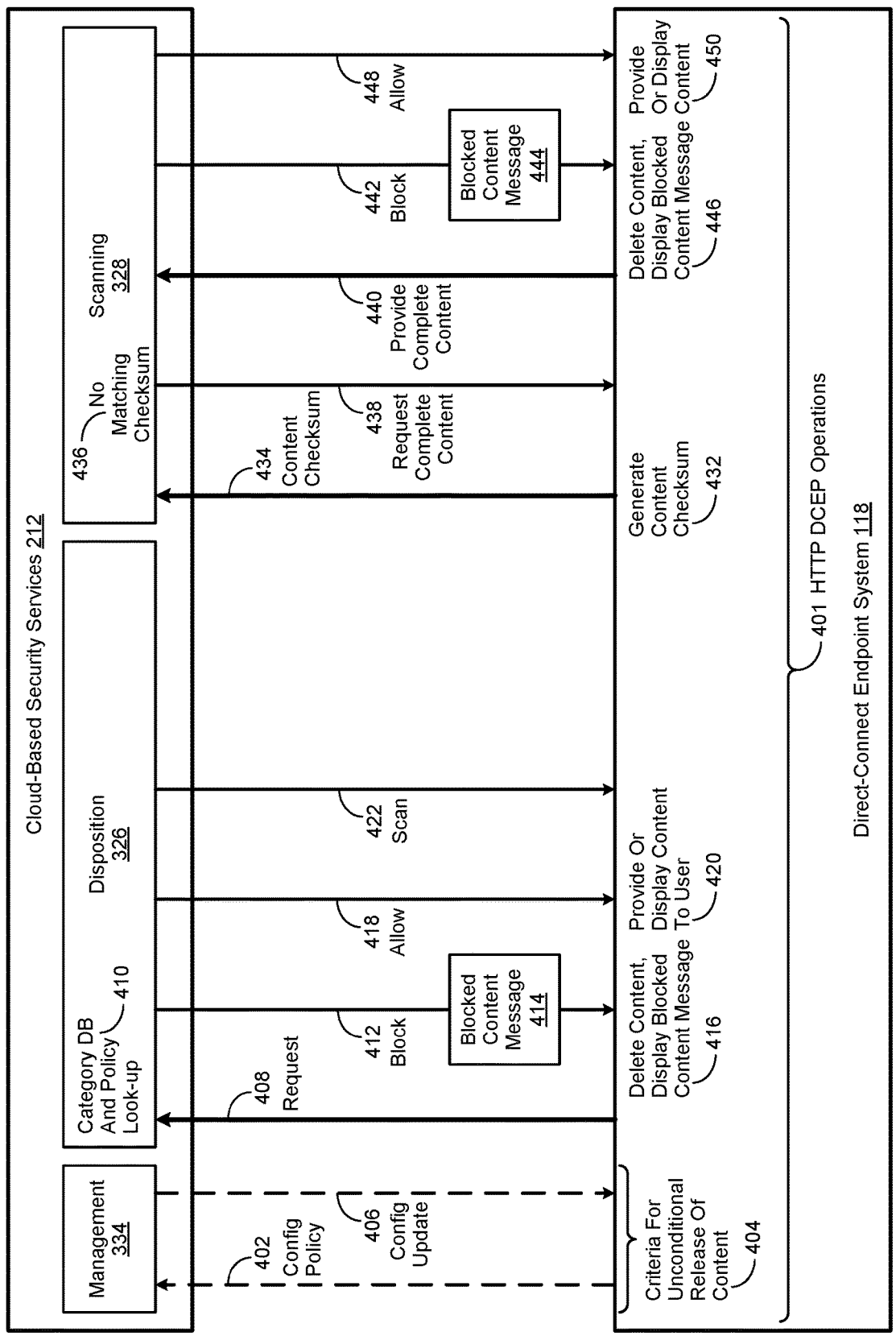
FIG. 4 shows a process flow when Hypertext Transfer Protocol (HTTP) interactions are used in the performance of DCEP system operations.

FIG. 4 shows a process flow implemented in accordance with an embodiment of the invention when Hypertext Transfer Protocol (HTTP) interactions are used in the performance of direct-connect endpoint system (DCEP) operations. In various embodiments, a DCEP 118 system is implemented with cloud-based security services 212 to perform associated HTTP DCEP operations 401 to enforce a security policy. In this embodiment, the DCEP 118 system submits a security policy configuration update request 402 to the cloud-based security services 212, where it is processed by a management 334 service, described in greater detail herein. In response, the management 334 service returns a security policy configuration update 406 to the DCEP 118 system. In certain embodiments, the security policy configuration update contains criteria 404, parameters and other data used by the DCEP 118 system to identify content received from a target server that is unconditionally allowed to be provided, or displayed, to a user.

In certain embodiments, the DCEP 118 system is configured to receive content directly from a target server without accessing an intermediate proxy server. Prior to providing or displaying the content to a user, the DCEP 118 system submits a Uniform Resource Locator (URL) and supporting information disposition request 408 to the cloud-based security services 212, where it is received by a disposition 326 service, described in greater detail herein. In various embodiments, the supporting information may include metadata associated with a particular user, such as their user identifier (ID), their physical location, the time the request is being made, the default language and version of the user's web-enabled application, and so forth. Those of skill in the art will recognize that many examples of such metadata are possible. Accordingly, the foregoing is not intended to limit the spirit, scope or intent of the invention.

Once the URL and supporting information disposition request 408 are received, they are parsed and processed by the disposition 326 service, as likewise described in greater detail herein, to generate request data. Once parsing and processing operations have been completed, the resulting request data is used to perform content category database and security policy look-up 410 operations. In turn, the results from the content category database and security policy look-up 410 operations, and the URL and supporting information disposition request 408, are processed by the disposition 326 service to generate a disposition determination.

In certain embodiments, the resulting disposition determination is to block 412 certain content received from a particular target server from being provided or displayed to a user. In this embodiment, a blocked content message 414 may be generated, which in turn is provided to the DCEP 118 system. In certain embodiments, a disposition determination to block 412 certain content results in the DCEP 118 system deleting the corresponding content received from the target server, displaying the blocked content message 416 to the user, or a combination thereof. In certain embodiments, the resulting disposition determination is to allow 418 certain content received from a target server to be provided or displayed to a user. In this embodiment, the corresponding content is provided or displayed to the user 420.

In various embodiments, the resulting disposition determination is to scan 422 certain content received from a target server before a disposition determination is generated. In certain embodiments, file and protocol header information contained in the URL disposition request 408 is provided to the scanning 328 service, where it is used to perform scanning operations. In certain embodiments, the file and protocol header information and the previously-parsed disposition data are processed to determine whether one or more security policies are applicable to certain content received from a particular target server.

In certain embodiments, the DCEP 118 system may be implemented to process certain content received from a particular target server to generate an associated checksum value 432, which is then provided 434 to the scanning 328 service. In certain embodiments, the scanning 328 service may be implemented to process the provided 434 checksum value 432 to determine whether there is a matching checksum value stored in a repository of security policies, URLs, and logs. In certain embodiments, the repository of security policies, URLs, and logs may be implemented to store previously-scanned content associated with an entity, their associated URL(s), and their corresponding content checksum values in a URL cache familiar to those of skill in the art.

In certain embodiments, a determination is made that no matching checksum value 436 was found in the repository of security policies, URLs, and logs. As a result, the scanning 328 service submits a request 438 to the DCEP 118 system requesting provision of the content corresponding to the previously-generated checksum value 432. In response, the DCSP 118 system provides 440 the content corresponding to the scanning 328 service. In turn, the scanning 328 service scans the provided 440 content and generates an associated disposition determination. The method by which the scanning 328 service scans the provided 440 content, and the method by which the disposition determination is generated, is a matter of design choice.

In certain embodiments, the resulting disposition determination is to block 442 the content from being provided or displayed to a user. In this embodiment, a blocked content message 444 is generated, which in turn is provided to the DCEP 118 system. In certain embodiments, a disposition determination to block 442 the content results in the DCEP 118 system deleting the corresponding content received from the target server, displaying the blocked content message 446 to the user, or a combination thereof. In certain embodiments, the resulting disposition determination is to allow 448 the content to be provided or displayed to a user. In this embodiment, the corresponding content is then provided or displayed to the user 450.

Figure 5:
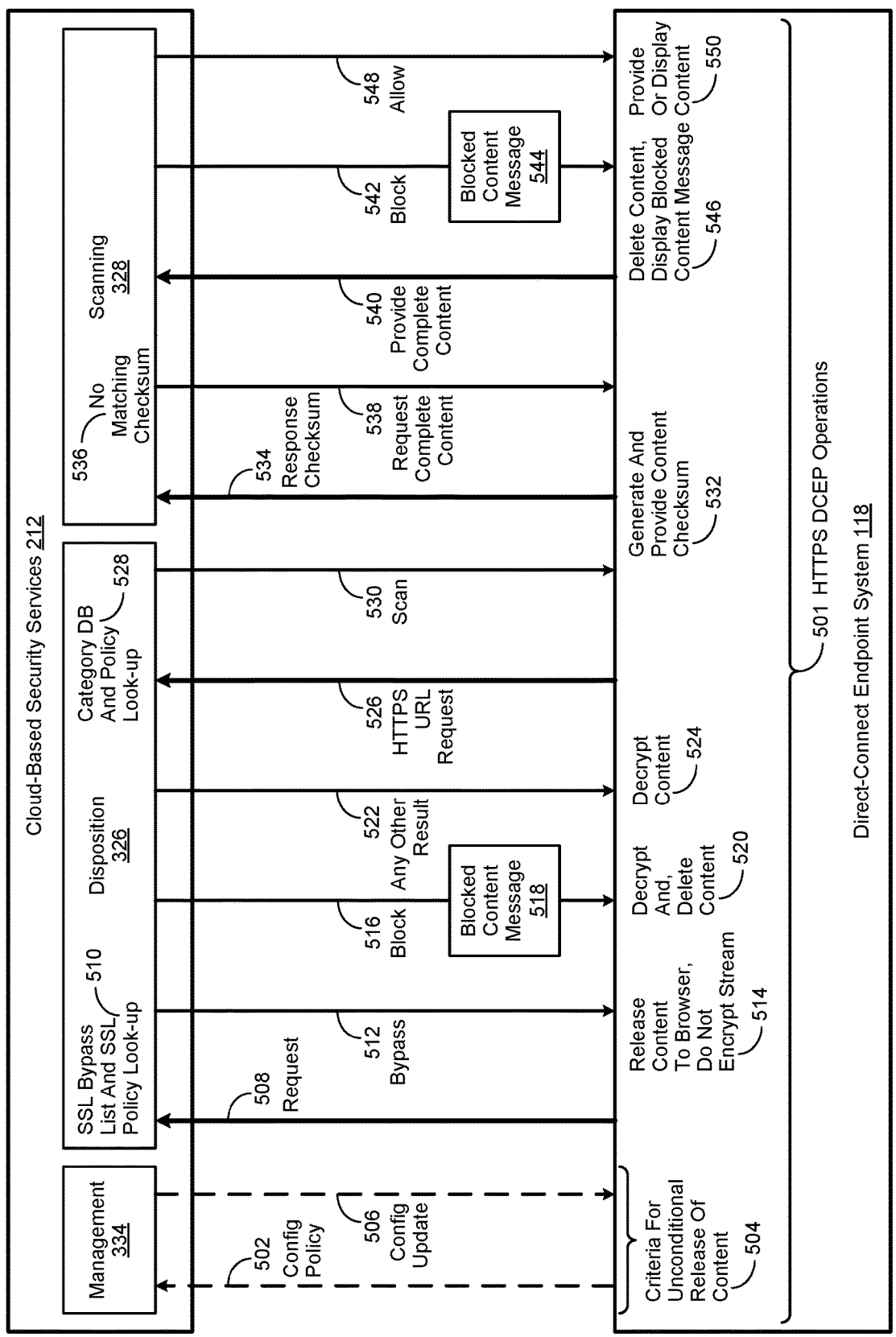
FIG. 5 shows a process when Secure HTTP (HTTPS) interactions are used in the performance of DCEP system operations.

FIG. 5 shows a process flow implemented in accordance with an embodiment of the invention when Secure Hypertext Transfer Protocol (HTTPS) interactions are used in the performance of direct-connect endpoint (DCEP) system operations. In various embodiments, a DCEP 118 system is implemented with cloud-based security services 212 to perform associated HTTPS DCEP operations 501 to enforce a security policy. In this embodiment, the DCEP 118 system submits a security policy configuration update request 502 to the cloud-based security services 212, where it is processed by a management 334 service, described in greater detail herein. In response, the management 334 service returns a security policy configuration update 506 to the DCEP 118 system. In certain embodiments, the security policy configuration update contains criteria 504, parameters and other data used by the DCEP 118 system to identify content received from a target server that is unconditionally allowed to be provided, or displayed, to a user.

In certain embodiments, the DCEP 118 system is configured to receive content directly from a target server without accessing an intermediate proxy server. Prior to providing or displaying the content to a user, the DCEP 118 system submits a Uniform Resource Locator (URL) disposition request 508 to the cloud-based security services 212, where it is received by a disposition 326 service, described in greater detail herein. Once the URL disposition request 508 is received, it is parsed and processed by the disposition 326 service, as likewise described in greater detail herein, to generate disposition data. Once parsing and processing operations have been completed, the resulting disposition data is used to perform Secure Socket Layer (SSL) bypass list and SSL security policy look-up 510 operations. In turn, the results from the SSL bypass list and SSL security policy look-up 510 and the URL disposition request 508, are processed by the disposition 326 service to generate a disposition determination.

In certain embodiments, the resulting disposition determination is to bypass 512 SSL encryption of the content provided by the target server. In this embodiment, the content provided by the target server is encrypted with the SSL protocol and is not decrypted until it has been allowed, or released, for provision or display to the user. In certain embodiments, the resulting disposition determination is to block 516 certain content received from a target server from being provided or displayed to a user. In this embodiment, a blocked content message 518 may be generated, which in turn is provided to the DCEP 118 system. In certain embodiments, a disposition determination to block 516 certain content results in the content provided by a target server being decrypted and then deleted 520. In certain embodiments, the resulting disposition determination is for any disposition determination other than bypass 512 or block 516 the content received from a target server (i.e., any other result 522). In this embodiment, the content received from a particular target server is then decrypted 524.

In various embodiments, the DCEP 118 system is implemented to submit an HTTPS URL disposition request 526 to the cloud-based security services 212, where it is received by a disposition 326 service, described in greater detail herein. Once the HTTPS URL disposition request 526 is received, it is parsed and processed by the disposition 326 service, as likewise described in greater detail herein, to generate disposition data. Once parsing and processing operations have been completed, the resulting disposition data is used to perform content category database and security policy look-up 528 operations. In turn, the results from the content category database and security policy look-up 528 operations, and the HTTPS URL disposition request 530, are processed by the disposition 326 service to generate a disposition determination.

In certain embodiments, the resulting disposition determination is to scan 530 certain content received from a target server before a disposition determination is generated. In certain embodiments, file and protocol header information contained in the URL disposition request 508 is provided to the scanning 328 service, where it is used to perform scanning operations. In certain embodiments, the file and protocol header information and the previously-parsed disposition data are processed to determine whether one or more security policies are applicable to certain content received from a particular target server.

In certain embodiments, the DCEP 118 system may be implemented to process certain content received from a particular target server to generate an associated checksum value 532, which is then provided 534 to the scanning 328 service. In certain embodiments, the scanning 328 service may be implemented to process the provided 534 checksum value 532 to determine whether there is a matching checksum value stored in a repository of security policies, URLs, and logs. In certain embodiments, the repository of security policies, URLs, and logs may be implemented to store URL and content checksum values in a URL cache familiar to those of skill in the art.

In certain embodiments, it is determined that no matching checksum 536 was found in the repository of security policies, URLs, and logs. As a result, the scanning 328 service submits a request 538 to the DCEP 118 system requesting provision of the content corresponding to the previously-generated checksum 432. In response, the DCEP 118 system provides 540 the content corresponding to the scanning 328 service. In turn, the scanning 328 service scans the provided 540 content and generates an associated disposition determination. The method by which the scanning 328 service scans the provided 540 content, and the method by which the disposition determination is generated, is a matter of design choice.

In certain embodiments, the resulting disposition determination is to block 542 the content from being provided or displayed to a user. In this embodiment, a blocked content message 544 may be generated, which in turn is provided to the DCEP 118 system. In certain embodiments, a disposition determination to block 542 the content results in the DCEP 118 system deleting the corresponding content received from the target server, displaying the blocked content message 546 to the user, or a combination thereof. In certain embodiments, the resulting disposition determination is to allow 548 the content to be provided or displayed to a user. In this embodiment, the corresponding content is then provided or displayed to the user 550.

Figure 6:
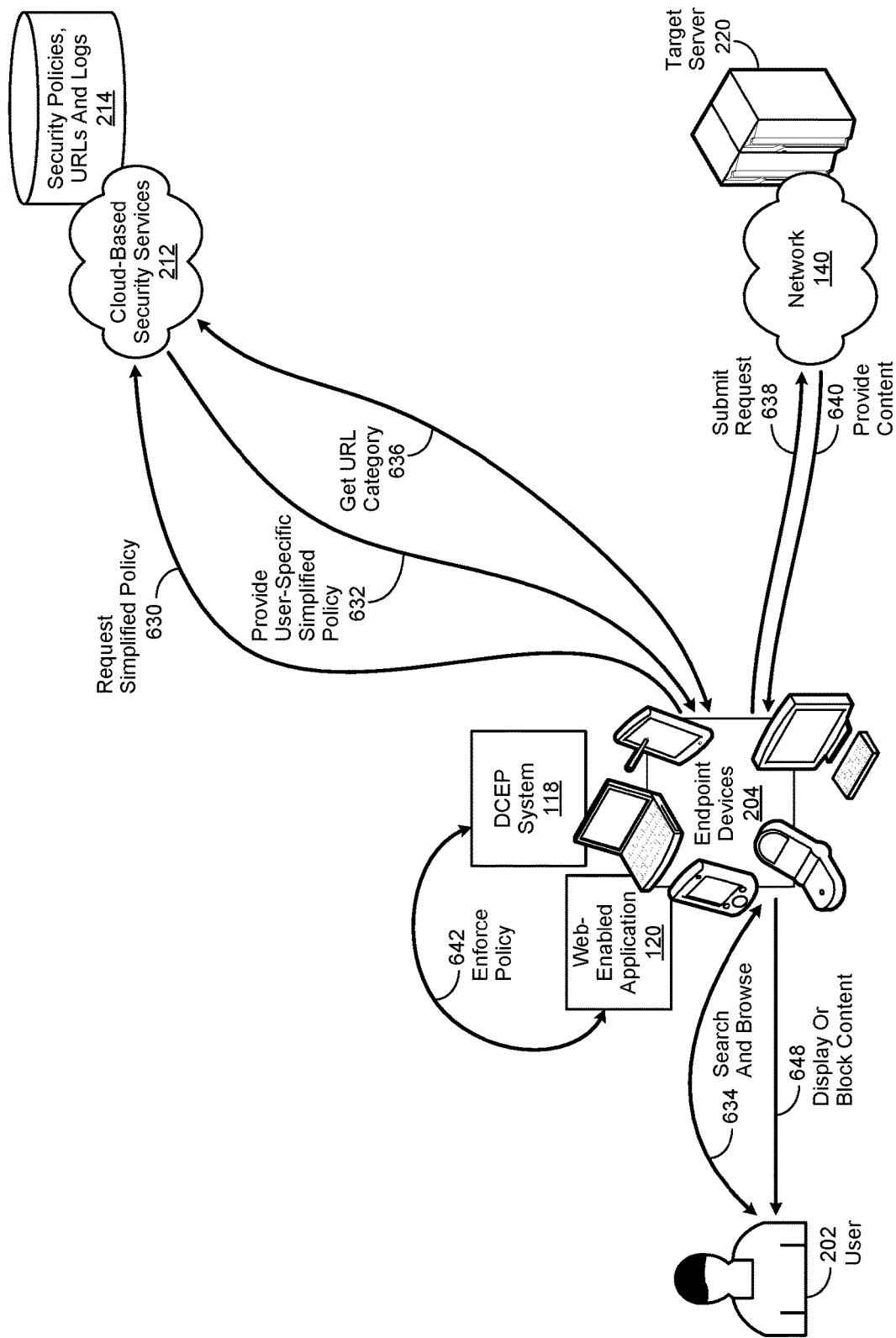
FIG. 6 shows a block diagram of a DCEP system implemented to enforce an endpoint security policy.

FIG. 6 graphically depicts a direct-connect endpoint (DCEP) system implemented in accordance with an embodiment of the invention to enforce an endpoint security policy. In various embodiments, a DCEP 118 system is implemented in combination with a web-enabled application 120, as described in greater detail herein, to enforce 642 an endpoint security policy associated with a user 202, an endpoint device 204, or a combination thereof. In this embodiment, the DCEP 118 system is configured to submit a request 630 to cloud-based security services 212, likewise described in greater detail herein, for a user-specific, simplified security policy.

In response, the cloud-based security services 212 access a repository 214 of security policies, URLs and information to identify a user-specific, simplified policy for the user 202, a particular endpoint device 204, or a combination thereof. In certain embodiments, the DCEP 118 system is configured to provide details associated with the security policy currently in use to the cloud-based security services 212. As an example, the version number of a user-specific security policy may be included in the request 630. As another example, the version number of a security policy associated with a particular endpoint device 204 may be included in the request 630.

In certain embodiments, the cloud-based security services 212 provide 632 a new user-specific, simplified security policy in response to the request 630. In certain embodiments, the cloud-based security services 212 provide 632 an updated user-specific, simplified security policy. In certain embodiments, the updated user-specific, simplified security policy includes criteria, parameters, and other security policy data that is used to update a user-specific, simplified security policy currently used by the DCEP 118 system. Skilled practitioners of the art will recognize that many such embodiments and examples are possible. Accordingly, the foregoing is not intended to limit the spirit, scope or intent of the invention.

The user 202 then uses the web-enabled application 120 to perform search and browse 634 operations in a network 140 environment, resulting in the submission of a request 638 for certain content residing on a target server 220. In response, the target server 220 provides 640 the requested content to the endpoint device 204, where it is intercepted by the DCEP 118 system. Once the requested content is received, it is processed by the DCEP 118 system to determine certain associated Uniform Resource Locator (URL) information. In certain embodiments, the URL information is compared to the current simplified user-specific security policy in use. In certain embodiments, the simplified user-specific security policy is implemented to allow unconditional access to any URL it contains. In certain embodiments, the DCEP 118 system is implemented to generate a URL disposition request, as described in greater detail herein, if the simplified user-specific security policy does not contain the URL associated with the content provided by the target server 220.

In certain embodiments, the URL disposition request includes the previously-determined URL information associated with the content provided by the target server. In certain embodiments, such a URL disposition request is submitted by the DCEP 118 system to the cloud-based security services 212 to get 636 a URL category corresponding to the URL information included in the URL disposition request. In certain embodiments, the URL category is used by the DCEP 118 system to enforce 642 the simplified user-specific security policy. In various embodiments, enforcement 642 of the simplified end-user security policy allows, or blocks, the provision or display 648 of the content received from the target server 220.

Figure 7:
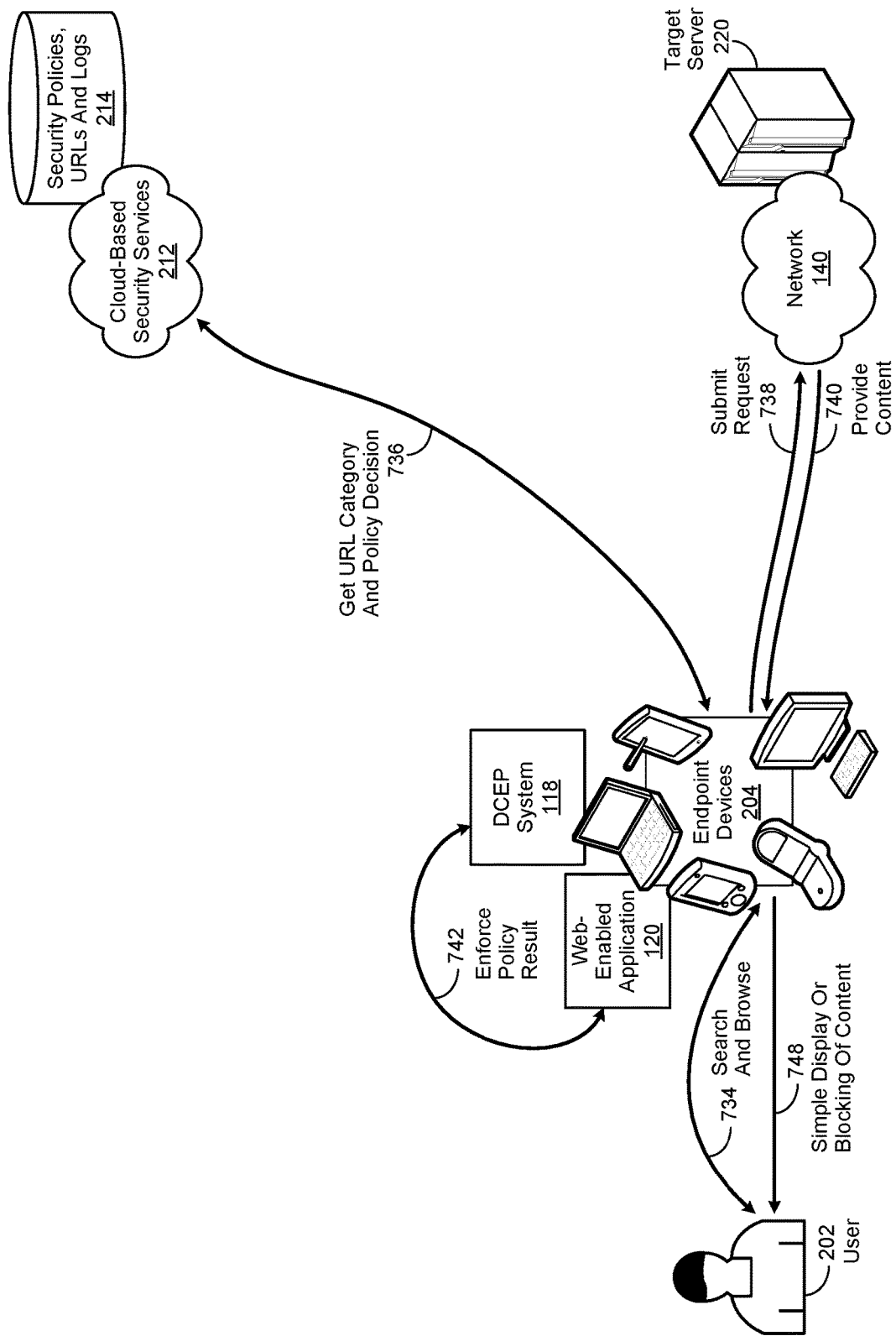
FIG. 7 shows a block diagram of a DCEP system implemented to enforce a cloud-based security policy.

FIG. 7 graphically depicts a direct-connect endpoint (DCEP) system implemented in accordance with an embodiment of the invention to enforce a cloud-based security policy. In various embodiments, a DCEP 118 system is implemented in combination with a web-enabled application 120, as described in greater detail herein, to enforce 742 a cloud-based security policy associated with a user 202, an endpoint device 204, or a combination thereof. In this embodiment, the user 202 uses the web-enabled application 120 to perform search and browse 734 operations in a network 140 environment, resulting in the submission of a request 738 for certain content residing on a target server 220. In response, the target server 220 provides 740 the requested content to the endpoint device 204, where it is intercepted by the DCEP 118 system.

Once the requested content is received, the content is processed by the DCEP 118 system to determine certain associated Uniform Resource Locator (URL) information. In certain embodiments, the URL information is implemented to generate a URL disposition request, as described in greater detail herein. In certain embodiments, the URL disposition request includes the previously-determined URL information associated with the content provided by the target server. In certain embodiments, such a URL disposition request is submitted by the DCEP 118 system to the cloud-based security services 212 to get 736 a URL category and security policy result corresponding to the URL information included in the URL disposition request. In certain embodiments, the URL category and security policy result are provided to the DCEP 118 system, which then enforces 742 it. In various embodiments, enforcement 742 of the cloud-based security policy allows, or blocks, the provision or display 748 of the content received from the target server 220.

Figure 8:
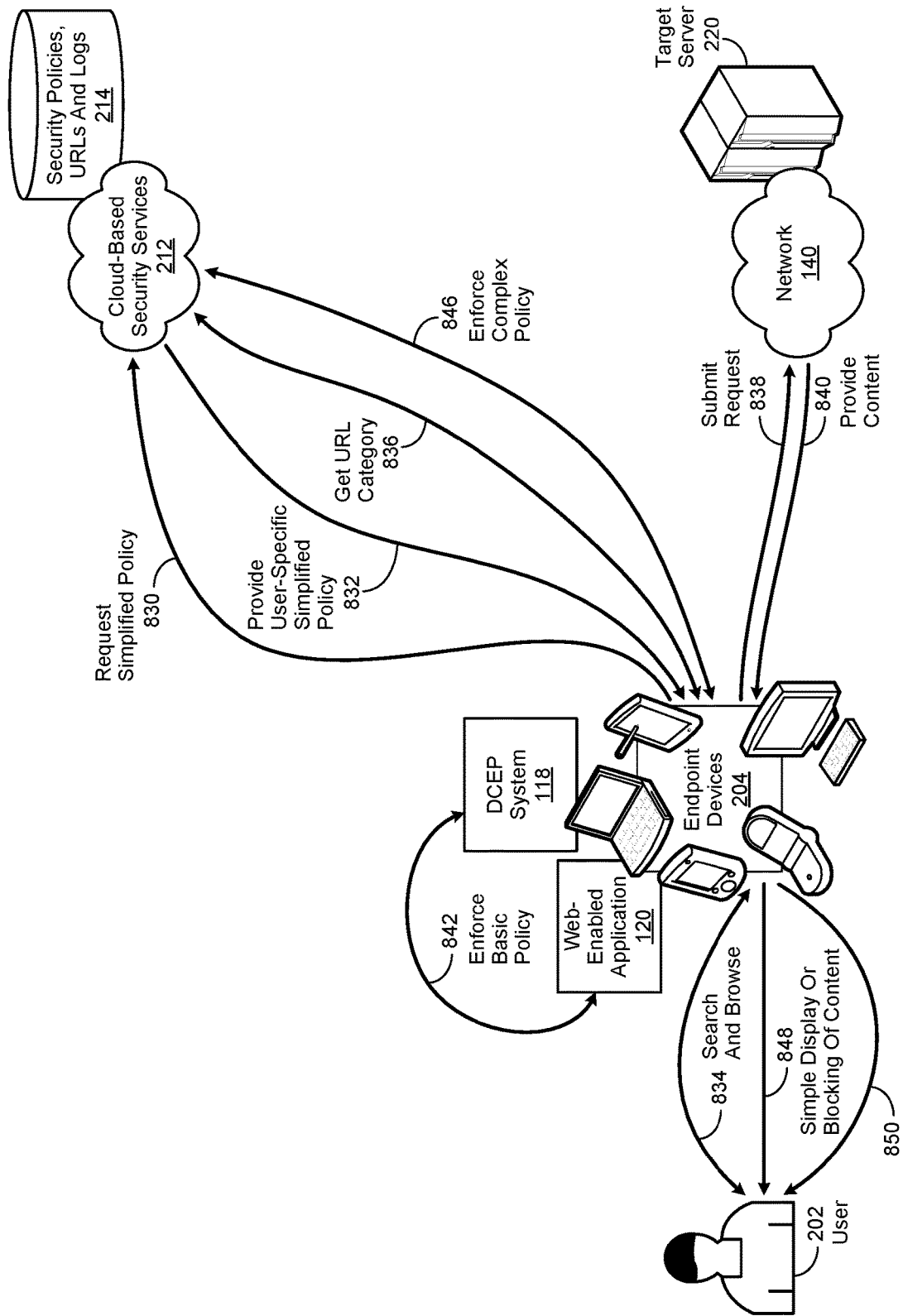
FIG. 8 shows a block diagram of the operation of a DCEP system implemented to offload security policy enforcement operations from cloud-based security services.

FIG. 8 graphically depicts the operation of a direct-connect endpoint (DCEP) system implemented in accordance with an embodiment of the invention to offload security policy enforcement operations from cloud-based security services. In various embodiments, a DCEP 118 system is implemented in combination with a web-enabled application 120, as described in greater detail herein. In certain of these embodiments, the DCEP 118 system is implemented to enforce 842 simplified, user-specific security policies (i.e., basic policies) associated with a user 202, an endpoint device 204, or a combination thereof. In this embodiment, the DCEP 118 is further implemented to enforce 846 complex, cloud-based security policies in combination with cloud-based security services 212.

In certain embodiments, the DCEP 118 system is configured to submit a request 830 to cloud-based security services 212, likewise described in greater detail herein, for a user-specific, simplified security policy. In response, the cloud-based security services 212 access a repository 214 of security policies, URLs and information to identify a user-specific, simplified policy for the user 202, a particular endpoint device 204, or a combination thereof. In certain embodiments, the DCEP 118 system is configured to provide details associated with the security policy currently in use to the cloud-based security services 212. As an example, the version number of a user-specific security policy may be included in the request 830. As another example, the version number of a security policy associated with a particular endpoint device 204 may be included in the request 830.

In certain embodiments, the cloud-based security services 212 provide 832 a new user-specific, simplified security policy in response to the request 830. In certain embodiments, the cloud-based security services 212 provide 832 an updated user-specific, simplified security policy. In certain embodiments, the updated user-specific, simplified security policy includes criteria, parameters, and other security policy data that is used to update a user-specific, simplified security policy currently used by the DCEP 118 system. Skilled practitioners of the art will recognize that many such embodiments and examples are possible. Accordingly, the foregoing is not intended to limit the spirit, scope or intent of the invention.

The user 202 then uses the web-enabled application 120 to perform search and browse 834 operations in a network 140 environment, resulting in the submission of a request 838 for certain content residing on a target server 220. In response, the target server 220 provides 840 the requested content to the endpoint device 204, where it is intercepted by the DCEP 118 system. Once the requested content is received, it is processed by the DCEP 118 system to determine certain associated Uniform Resource Locator (URL) information. In certain embodiments, the URL information is compared to the current simplified user-specific security policy in use. In certain embodiments, the simplified user-specific security policy is implemented to allow unconditional access to any URL it contains. In certain embodiments, the DCEP 118 system is implemented to generate a URL disposition request, as described in greater detail herein, if the simplified user-specific security policy does not contain the URL associated with the content provided by the target server 220.

In certain embodiments, the URL disposition request includes the previously-determined URL information associated with the content provided by the target server. In certain embodiments, such a URL disposition request is submitted by the DCEP 118 system to the cloud-based security services 212 to get 836 a URL category corresponding to the URL information included in the URL disposition request. In certain embodiments, the URL category is used by the DCEP 118 system to enforce 842 the simplified, user-specific security policy. In various embodiments, enforcement 842 of the simplified, end-user security policy allows, or blocks, the provision or display 848 of the content received from the target server 220.

In certain embodiments, the URL disposition request is submitted by the DCEP 118 system to the cloud-based security services 212 to enforce 846 a complex security policy result corresponding to the URL information included in the URL disposition request. In certain embodiments, a complex security policy result is a result of a security policy that cannot be performed by the endpoint. For example, a policy that requires a combination of conditions between time, location and membership of the user in a particular corporate group. Such conditions could not be evaluated via a simple policy enforcement at the endpoint. In certain embodiments, enforcement 846 of the complex security policy result is performed by the cloud-based security services 212. In certain embodiments, enforcement 846 of the complex security policy result is performed by the cloud-based security services 212 in combination with the DCEP 118 system. In various embodiments, enforcement 846 of the cloud-based security policy allows, or blocks, the conditional provision or display 850 of the content received from the target server 220.

From the foregoing, skilled practitioners of the art will recognize that such a combined approach to enforcing endpoint and cloud-based security policies allows simpler policy enforcement to be performed by the DCEP 118 system at a lower computational and operational cost. Likewise, such a combined approach also allows the cloud-based security services 212 to be more efficiently used in the enforcement of more complex security policies. In various embodiments, the determination of what constitutes a simplified, user-defined security and a complex, cloud-based security policy, is a matter of design choice.

Figure 9:
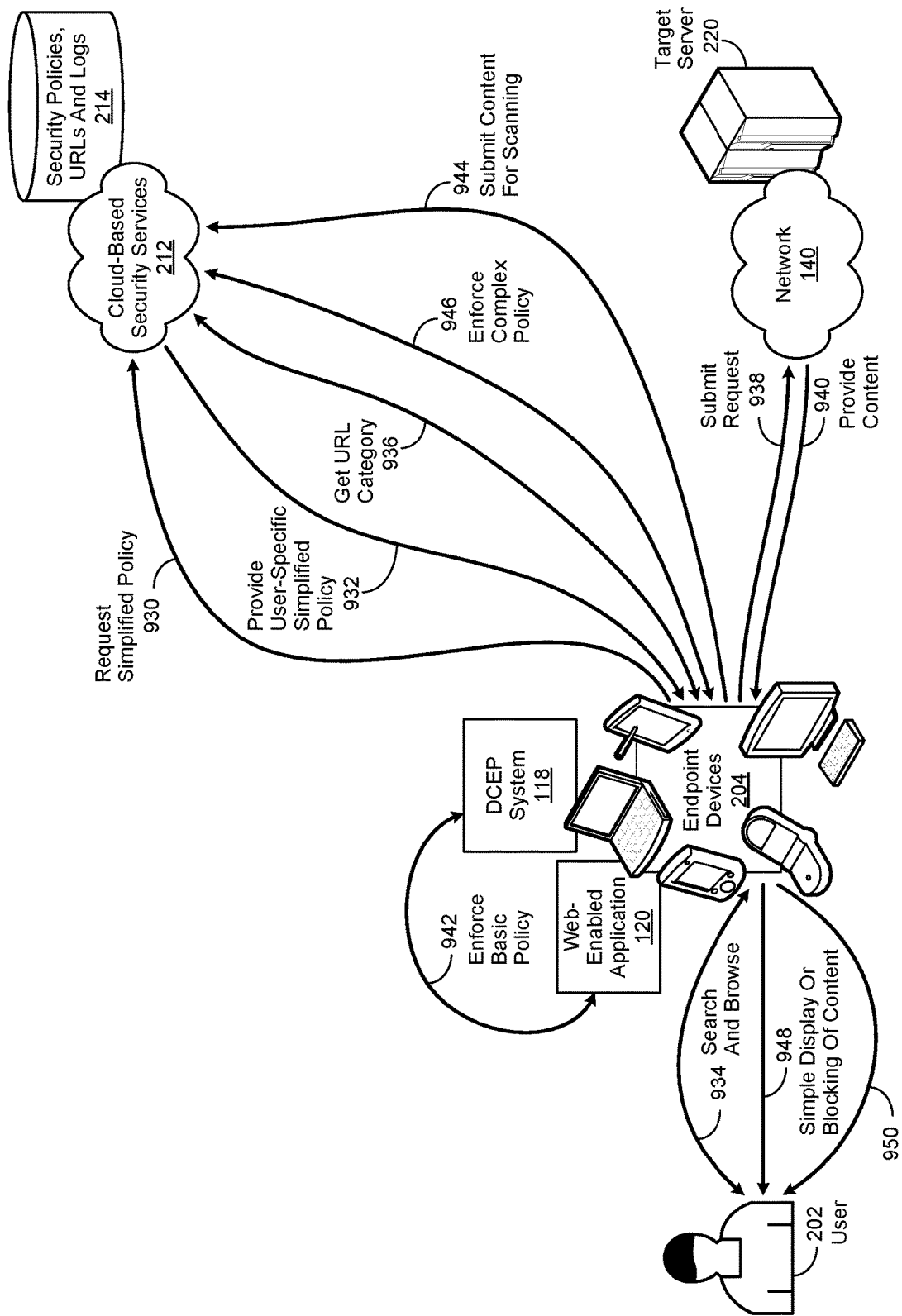
FIG. 9 shows a block diagram of a DCEP system implemented to scan content associated with the enforcement of an endpoint or cloud-based security policy.

FIG. 9 graphically depicts a direct-connect endpoint (DCEP) system implemented in accordance with an embodiment of the invention to scan content associated with the enforcement of an endpoint or cloud-based security policy. In various embodiments, the DCEP 118 system is implemented to enforce 942 simplified, user-specific security policies (i.e., basic policies) associated with a user 202, an endpoint device 204, or a combination thereof In certain embodiments, the DCEP 118 system is further implemented to enforce 946 complex, cloud-based security policies in combination with cloud-based security services 212. In this embodiment, the DCEP 118 system is yet further implemented to include scanning of certain content provided by a particular target server 220, as described in greater detail herein, to respectively enforce 942, 946 simplified, end-user and complex, cloud-based security policies.

In various embodiments, the DCEP 118 system is configured to submit a request 930 to cloud-based security services 212, likewise described in greater detail herein, for a user-specific, simplified security policy. In response, the cloud-based security services 212 access a repository 214 of security policies, URLs and information to identify a user-specific, simplified policy for the user 202, a particular endpoint device 204, or a combination thereof. In certain embodiments, the DCEP 118 system is configured to provide details associated with the security policy currently in use to the cloud-based security services 212. As an example, the version number of a user-specific security policy may be included in the request 930. As another example, the version number of a security policy associated with a particular endpoint device 204 may be included in the request 930.

In certain embodiments, the cloud-based security services 212 provide 932 a new user-specific, simplified security policy in response to the request 930. In certain embodiments, the cloud-based security services 212 provide 932 an updated user-specific, simplified security policy. In certain embodiments, the updated user-specific, simplified security policy includes criteria, parameters, and other security policy data that is used to update a user-specific, simplified security policy currently used by the DCEP 118 system.

Skilled practitioners of the art will recognize that many such embodiments and examples are possible. Accordingly, the foregoing is not intended to limit the spirit, scope or intent of the invention.

The user 202 then uses the web-enabled application 120 to perform search and browse 934 operations in a network 140 environment, resulting in the submission of a request 938 for certain content residing on a target server 220. In response, the target server 220 provides 940 the requested content to the endpoint device 204, where it is intercepted by the DCEP 118 system. Once the requested content is received, it is processed by the DCEP 118 system to determine certain associated Uniform Resource Locator (URL) information. In certain embodiments, the URL information is compared to the current simplified user-specific security policy in use. In certain embodiments, the simplified user-specific security policy is implemented to allow unconditional access to any URL it contains. In certain embodiments, the DCEP 118 system is implemented to generate a URL disposition request, as described in greater detail herein, if the simplified user-specific security policy does not contain the URL associated with the content provided by the target server 220.

In certain embodiments, the URL disposition request includes the previously-determined URL information associated with the content provided by the target server. In certain embodiments, such a URL disposition request is submitted by the DCEP 118 system to the cloud-based security services 212 to get 936 a URL category corresponding to the URL information included in the URL disposition request. In certain embodiments, the URL category is used by the DCEP 118 system to enforce 942 the simplified, user-specific security policy. In various embodiments, enforcement 942 of the simplified, end-user security policy allows, or blocks, the provision or display 948 of the content received from the target server 220.

In certain embodiments, the URL disposition request is submitted by the DCEP 118 system to the cloud-based security services 212 to generate a complex security policy result corresponding to the URL information included in the URL disposition request. In certain embodiments, as described in greater detail herein, the DCEP 118 system is configured to submit 944 the content provided by the target server 220 to the cloud-based security services 212 for scanning. As likewise described in greater detail, the results of such scanning are then used by the cloud-based security services 212 to generate a complex security policy result. In these embodiments, enforcement 946 of the resulting complex security policy results is performed by the cloud-based security services 212. In certain embodiments, enforcement 946 of the complex security policy result is performed by the cloud-based security services 212 in combination with the DCEP 118 system. In various embodiments, enforcement 946 of the cloud-based security policy allows, or blocks, the conditional provision or display 950 of the content received from the target server 220.

From the foregoing, skilled practitioners of the art will recognize that such a combined approach to enforcing endpoint and cloud-based security policies, when additionally implemented with content scanning, allows simpler policy enforcement to be performed by the DCEP 118 system at a lower computational and operational cost. Likewise, such a combined approach, when additionally implemented with content scanning, also allows the cloud-based security services 212 to be more efficiently used in the enforcement of more complex security policies. In various embodiments, the determination of what constitutes a simplified, user-defined security and a complex, cloud-based security policy, is a matter of design choice.

Figure 10A:
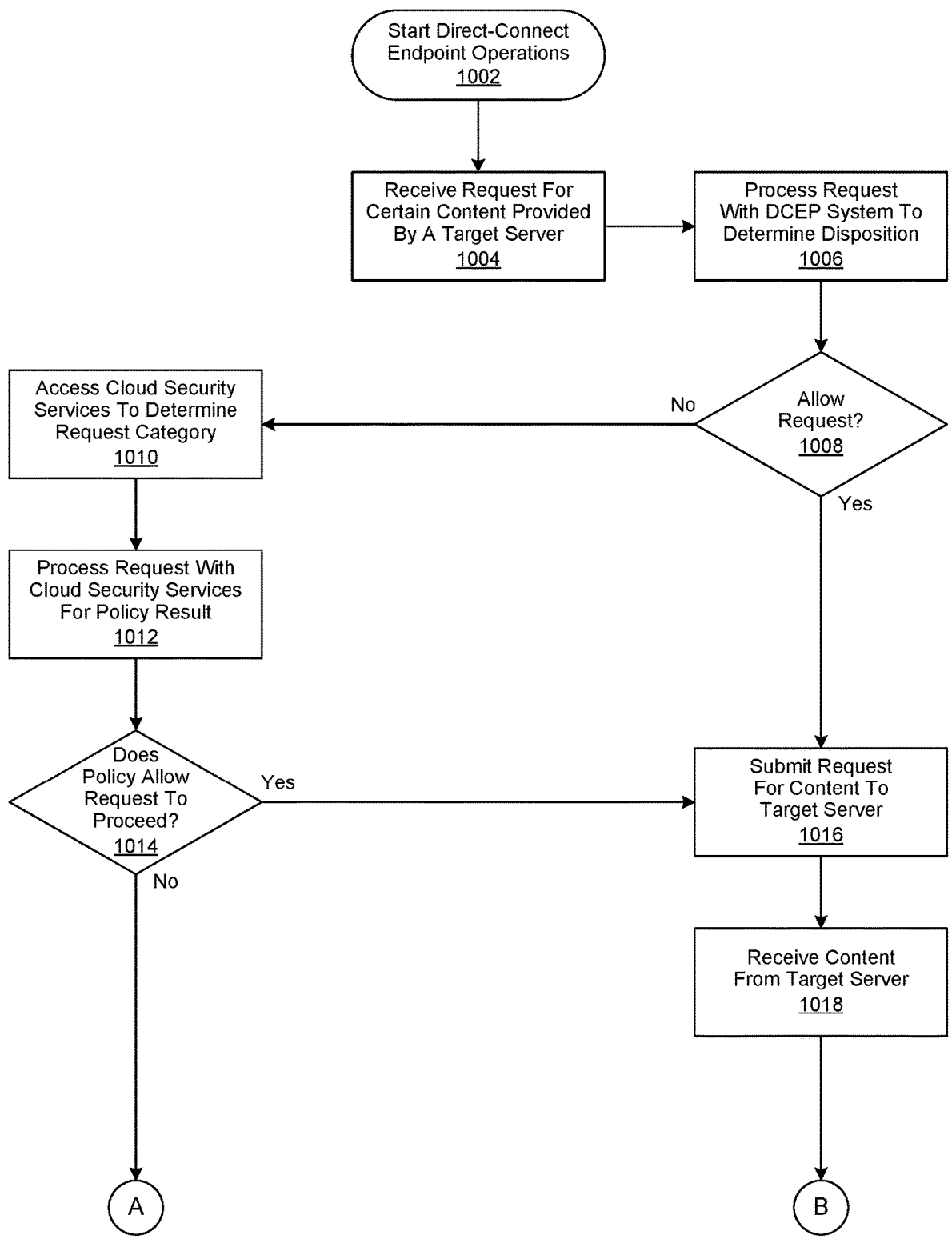
FIGS. 10a and 10b are a generalized flowchart of the operation of a DCEP system.
Figure 10B:
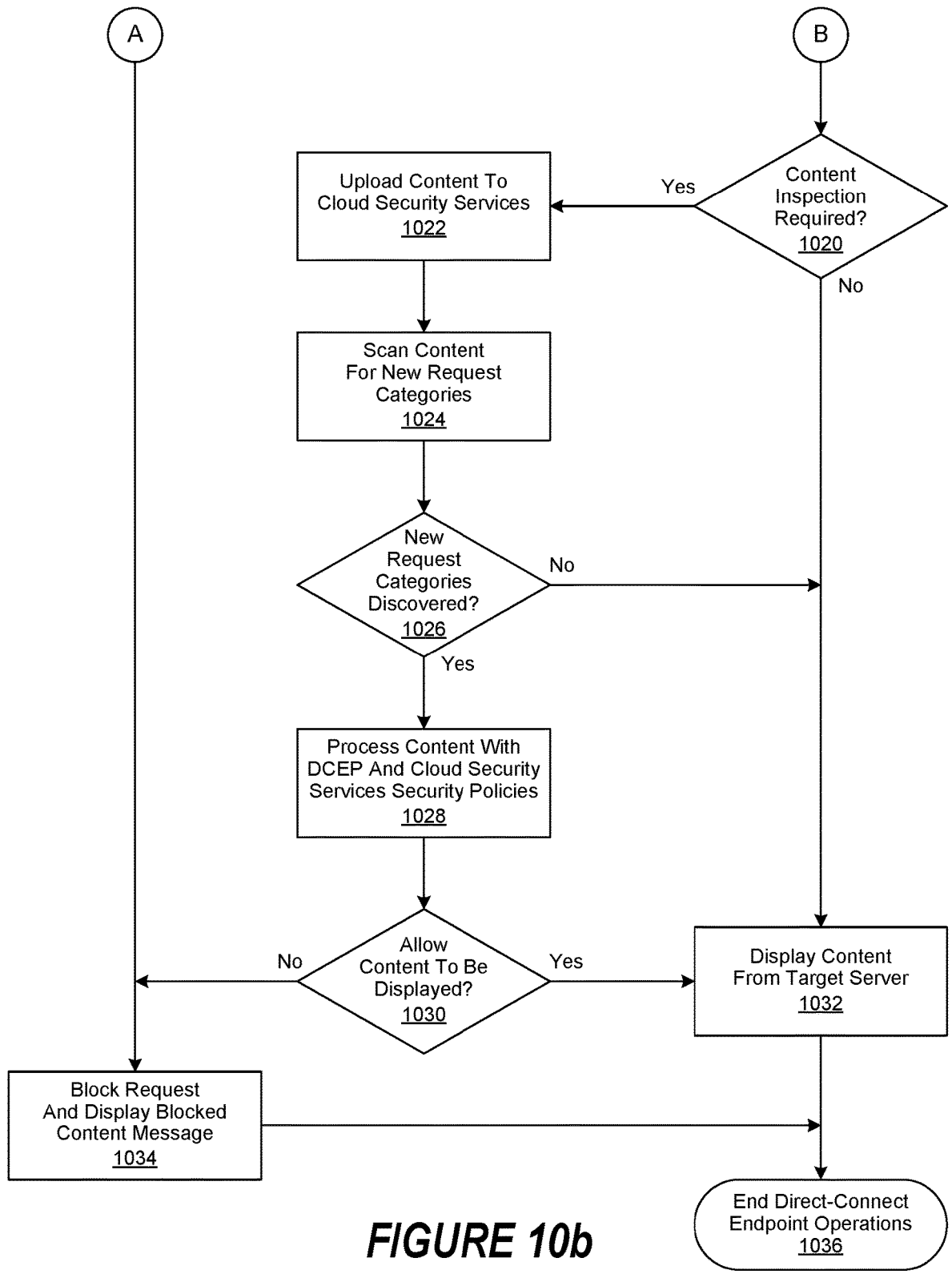

FIGS. 10a and 10b are a generalized flowchart of the performance of direct-connect endpoint system operations to provide endpoint security. In this embodiment, direct-connect endpoint (DCEP) system operations are begun in step 1002, followed by the receipt of a request in step 1004 for certain content provided by a particular target server. The request is then processed by the DCEP system in step 1006 to determine the disposition of the request. In various embodiments, as described in greater detail herein, the DCEP system may use a simplified, user-specific security policy to determine the disposition of the request.

Based upon the disposition determined in step 1006, a determination is then made in step 1008 whether to allow the request to proceed. If not, then cloud-based security services are accessed in step 1010 to determine a category for the request. In certain embodiments, the request is provided to the cloud-based security services as a Uniform Resource Locator (URL) and supporting information disposition request, described in greater detail herein. Once received, the URL and supporting information disposition request are processed by the cloud-based security services in step 1012, as likewise described in greater detail herein, to determine a security policy result.

A determination is then made in step 1014 whether the resulting security policy result allows the request to proceed. If so, or if it was determined in step 1008 to allow the request to proceed, then the request for content is submitted to the target server in step 1016. In response, the requested content is received from the target server in step 1018. A determination is then made in step 1020 whether the provided content requires inspection. If so, then the provided content is uploaded to the cloud-based security services in step 1022, where it is scanned in step 1024 for new request categories.

A determination is then made in step 1026 whether new request categories were discovered. If so, then in step 1028 the content is processed with both the simplified, user-specific and cloud-based security policies. A determination is then made in step 1030 whether to allow the provision, or display, of the content to the user. If not, or if it was determined in step 1014 that the security policy does not allow the request to proceed, then the request is blocked and a blocked content message is displayed to the user in step 1034. Otherwise, or if it was respectively determined in step 1020 that no content inspection was required, or in step 1026 that no new request categories were discovered, then the content provided by the target server is provided, or displayed, to the user in step 1032. Thereafter, or once the request is blocked and a blocked content message is displayed to the user in step 1034, DCEP system operations are ended in step 1036.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as the Java programming language, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for enforcing a security policy, comprising:
   determining when an endpoint device initiates a web transaction with a web server, the endpoint device initiating the web transaction using a web-enabled application;
   establishing a side channel to a security service when the endpoint device initiates the web transaction using the web-enabled application, the side channel being established via a direct-connect endpoint system, the direct-connect endpoint system comprising a direct-connect endpoint engine and a driver, the direct-connect endpoint engine comprising a system service module and an endpoint filter engine, the driver comprising an endpoint filter driver, the system service module receiving security policy configuration information from the security service, the endpoint filter engine applying a filter according to the security service, the filter being applied to the web-enabled application via the endpoint filter driver;
   performing a categorization and policy enforcement operation via the security service in parallel with initiating the web transaction, the categorization and policy enforcement operation applying a security policy to the web transaction and determining a security policy result regarding the web transaction based upon the security policy;
   withholding content resulting from performance of the web transaction until the security policy result is provided by the security service, the content being withheld from a user at the endpoint device;
   releasing the content resulting from the web transaction to the web-enabled application of the endpoint device upon receipt of an affirmative policy result from the security service; and
   blocking the content from the user when the security policy result is not affirmative.

2. The method of claim 1, wherein:
   the endpoint device accesses a website via a direct connection to a target server, the target server comprising the web server.

3. The method of claim 1, wherein:
   the categorization and policy enforcement operation comprises performing a disposition request, the disposition request submitting Uniform Resource Locator information associated with a target server to the security service.

4. The method of claim 3, wherein:
   the disposition request comprises header information associated with files contained in content provided by the target server.

5. The method of claim 1, wherein:
   the policy result comprises a security policy result from a cloud-based security policy.

6. The method of claim 1, wherein:
   the content resulting from the web transaction is held within a direct-connect endpoint system of the endpoint device.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   determining when an endpoint device initiates a web transaction with a web server, the endpoint device initiating the web transaction using a web-enabled application;
   establishing a side channel to a security service when the endpoint device initiates the web transaction using the web-enabled application, the side channel being established via a direct-connect endpoint system, the direct-connect endpoint system comprising a direct-connect endpoint engine and a driver, the direct-connect endpoint engine comprising a system service module and an endpoint filter engine, the driver comprising an endpoint filter driver, the system service module receiving security policy configuration information from the security service, the endpoint filter engine applying a filter according to the security service, the filter being applied to the web-enabled application via the endpoint filter driver;
   performing a categorization and policy enforcement operation via the security service in parallel with initiating the web transaction, the categorization and policy enforcement operation applying a security policy to the web transaction and determining a security policy result regarding the web transaction based upon the security policy;
   withholding content resulting from performance of the web transaction at the endpoint device until the security policy result is provided by the security service, the content being withheld from a user at the endpoint device;
   releasing the content resulting from the web transaction to the web-enabled application of the endpoint device upon receipt of an affirmative policy result from the security service; and
   blocking the content from the user when the security policy result is not affirmative.

8. The system of claim 7, wherein:
   the endpoint device accesses a website via a direct connection to a target server, the target server comprising the web server.

9. The system of claim 7, wherein:
   the categorization and policy enforcement operation comprises performing a disposition request, the disposition request submitting Uniform Resource Locator information associated with a target server to the security service.

10. The system of claim 9, wherein:
    the disposition request comprises header information associated with files contained in content provided by the target server.

11. The system of claim 7, wherein:
    the policy result comprises a security policy result from a cloud-based security policy.

12. The system of claim 7, wherein:
the content resulting from the web transaction is held within a direct-connect endpoint system of the endpoint device.

13. A non-transitory, computer-readable storage medium embodying computer program code, the computer program code comprising computer executable instructions configured for:
determining when an endpoint device initiates a web transaction with a web server, the endpoint device initiating the web transaction using a web-enabled application;
establishing a side channel to a security service when the endpoint device initiates the web transaction using the web-enabled application, the side channel being established via a direct-connect endpoint system, the direct-connect endpoint system comprising a direct-connect endpoint engine and a driver, the direct-connect endpoint engine comprising a system service module and an endpoint filter engine, the driver comprising an endpoint filter driver, the system service module receiving security policy configuration information from the security service, the endpoint filter engine applying a filter according to the security service, the filter being applied to the web-enabled application via the endpoint filter driver;
performing a categorization and policy enforcement operation via the security service in parallel with initiating the web transaction, the categorization and policy enforcement operation applying a security policy to the web transaction and determining a security policy result regarding the web transaction based upon the security policy;
withholding content resulting from performance of the web transaction at the endpoint device until the security policy result is provided by the security service, the content being withheld from a user at the endpoint device;
releasing the content resulting from the web transaction to the web-enabled application of the endpoint device upon receipt of an affirmative policy result from the security service; and
blocking the content from the user when the security policy result is not affirmative.

14. The non-transitory, computer-readable storage medium of claim 13, wherein:
the endpoint device accesses a website via a direct connection to a target server, the target server comprising the web server.

15. The non-transitory, computer-readable storage medium of claim 13, wherein:
the categorization and policy enforcement operation comprises performing a disposition request, the disposition request submitting Uniform Resource Locator information associated with a target server to the security service.

16. The non-transitory, computer-readable storage medium of claim 15, wherein:
the disposition request comprises header information associated with files contained in content provided by the target server.

17. The non-transitory, computer-readable storage medium of claim 13, wherein:
the policy result comprises a security policy result from a cloud-based security policy.

18. The non-transitory, computer-readable storage medium of claim 13, wherein:
the content resulting from the web transaction is held within a direct-connect endpoint system of the endpoint device.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *